(12) United States Patent
Bichrest

(10) Patent No.: US 12,464,987 B2
(45) Date of Patent: Nov. 11, 2025

(54) DYNAMICALLY POSITIONABLE PLANTER

(71) Applicant: Jordan Bichrest, Harpswell, ME (US)

(72) Inventor: Jordan Bichrest, Harpswell, ME (US)

( * ) Notice: Subject to any disclaimer, the term of this patent is extended or adjusted under 35 U.S.C. 154(b) by 0 days.

(21) Appl. No.: 18/441,423

(22) Filed: Feb. 14, 2024

(65) Prior Publication Data
US 2025/0255223 A1    Aug. 14, 2025

(51) Int. Cl.
*A01G 9/02*    (2018.01)

(52) U.S. Cl.
CPC .................................... *A01G 9/023* (2013.01)

(58) Field of Classification Search
CPC ................................ A01G 9/023; A01G 9/022
See application file for complete search history.

(56) References Cited

U.S. PATENT DOCUMENTS

| | | | | |
|---|---|---|---|---|
| 5,730,068 A | * | 3/1998 | Rioux, Jr. | A47F 5/10 108/92 |
| 6,557,491 B1 | * | 5/2003 | Weiser | A01K 39/014 119/57.8 |
| 11,708,219 B1 | * | 7/2023 | Talda | B65G 65/00 211/85.8 |
| 2014/0041298 A1 | * | 2/2014 | Mack | B62B 3/04 47/66.6 |
| 2019/0335681 A1 | * | 11/2019 | Oberthier | B65G 23/24 |
| 2022/0217914 A1 | * | 7/2022 | Olsson | A01G 31/06 |

FOREIGN PATENT DOCUMENTS

| | | | | |
|---|---|---|---|---|
| WO | WO-2009018618 A1 | * | 2/2009 | ........... A01G 9/022 |
| WO | WO-2015122849 A1 | * | 8/2015 | ........... A01G 27/008 |

* cited by examiner

*Primary Examiner* — Kristen C Hayes

(57) ABSTRACT

A plant holder that is configured to hold multiple plant pots and that is rotatable so that the pots may be positioned on either side of the planter or positioned in a flat work-table like manner.

11 Claims, 14 Drawing Sheets

DYNAMICALLY POSITIONABLE PLANTER

BACKGROUND INFORMATION

Field of the Invention

The invention relates to plant pot holders, plant stands, and gardening tables.

Discussion of Prior Art

There are many known benefits from growing, having, and being around various forms of plants. Fruits and vegetables, of course, have many nutritional benefits, while non-edible plants have numerous benefits from being aesthetically pleasing to potentially even reducing stress and increasing productivity.

While many plants need little more than soil, water, and light in order to grow, that growth is often hindered if the plant does not get enough light or space to grow. And this often poses a greater challenge when growing a number of plants in pots as the various pots may block one another and cause plants to compete for sunlight. For example, it is common to have number of plants on a gardening table or similar work surface. This is helpful as it may be ergonomic for the grower, however, as certain plants grow, they may limit access to light for other plants on the table. Similarly, if a number of platforms are layered or stacked on top of one another this may also limit growth.

Another complication may arise in indoor situations where, if the plants are positioned towards the window they may not be as visible to the inside of the room where they are most visible to the inhabitants, or alternatively the plants may not have proper access to sunlight if they are positioned away from windows and towards the inside of the room. A staggered arrangement is also difficult to work, whereas a flat table-like arraignment does not provide ideal light and/or viewing of the plants.

What is needed, therefore, is a planter that allows multiple plants to be placed in multiple positions to separately allow the plants to obtain the necessary access to light, allow a grower to have convenient access to the plants, and present the plants to an interior of the room.

BRIEF SUMMARY OF THE INVENTION

The invention is a rotatable plant holder that holds multiple pots and that may alternatively be positioned in a staggered arrangement to allow multiple rows of pots to have equal access to light, to lay flat in a work-table like arrangement, and to be staggered in multiple orientations to allow the best access to light and/or present the plants in the best viewing position.

The plant holder includes a base frame and a planter frame, with the planter frame configured to hold a number of planter trays that may be configured in a number of ways to hold pots of various shapes and sizes. The configuration of the base frame may vary depending on the area of the intended use of the device, and in particular, whether the device is to be used inside a building or outside. More specifically, when the device is intended to be used inside, it is likely to have a narrow base so that it may be positioned close to a window for ideal light as well as to take up less floor space, and such a design may include a base that is somewhat off-center relative to the planter frame and require a counterweight to keep it in the proper position. On the other hand, a device that is intended to be used outside likely does not have such limitations and as such, the base may be wider and be equally spaced on either side of the planter frame.

The planter frame is rotatably supported in the base frame such that it may move 360 degrees in the vertical plane. The planter trays are coupled to the planter frame by swivel rods that enable the trays to maintain an upright position as the planter frame rotates relative to the base frame. The planter trays are also balanced to further assist in maintaining an upright position as the planter frame is rotated within the base frame.

As such, the planter frame may be angled towards a window, for example with a 30-45-degree angle, and each plant in each of the trays would have full access to the light. The planter frame may also be laid flat at 90 degrees in which case the planter frame and planter trays resemble a form of gardening table. Alternatively, if for example it is dark outside and there is little benefit to positioning the plants towards the window, the planter frame may be rotated towards an inner portion of the room where the plants are better viewed by those in the room.

BRIEF DESCRIPTION OF THE DRAWINGS

The present invention is described with reference to the accompanying drawings. In the drawings, like reference numbers indicate identical or functionally similar elements. The drawings are not drawn to scale.

DETAILED DESCRIPTION OF THE INVENTION

Figure 1:
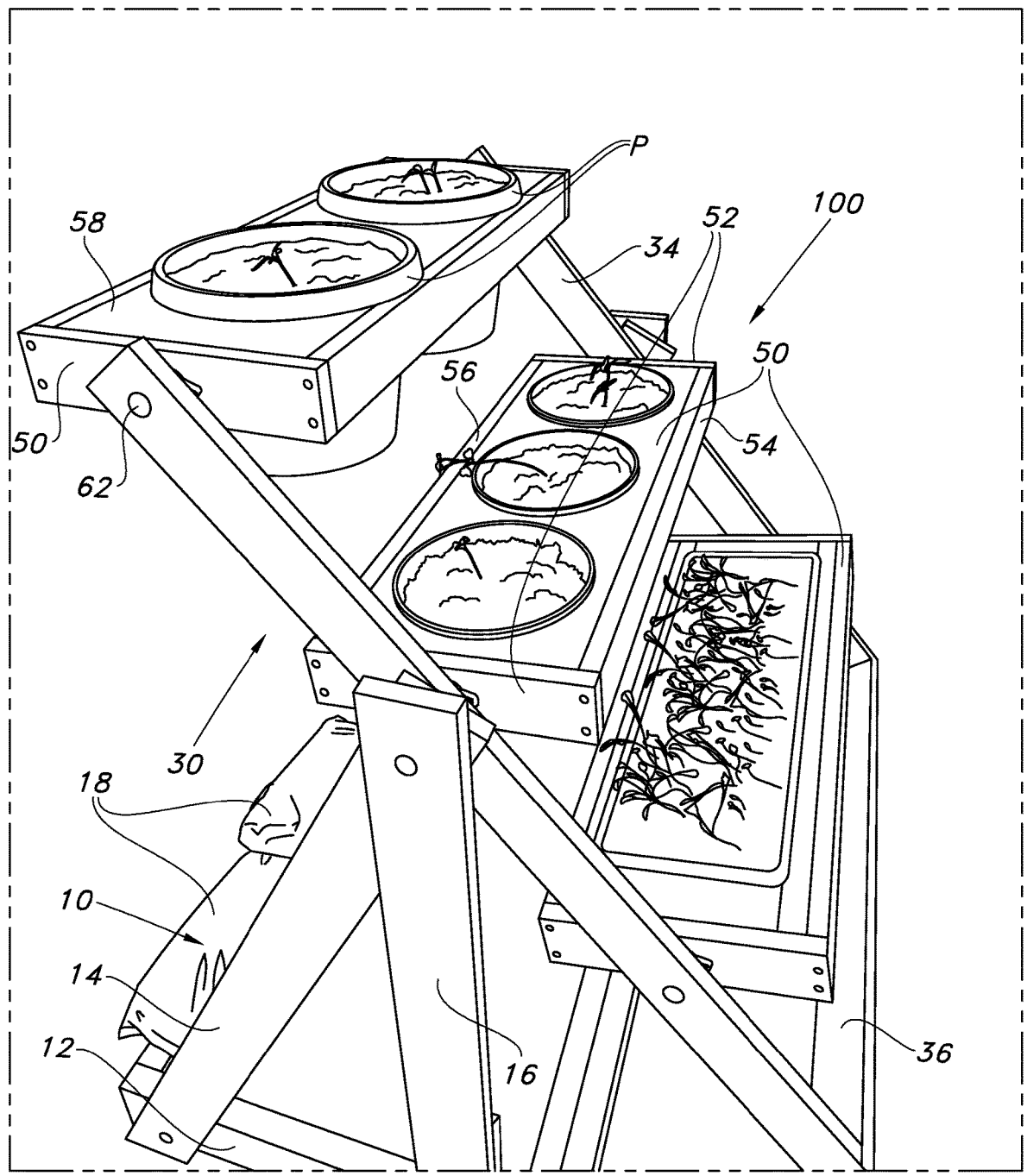
FIG. 1 is a perspective view of the planter showing the planter frame oriented towards a room and the trays in a viewing position.
Figure 2:
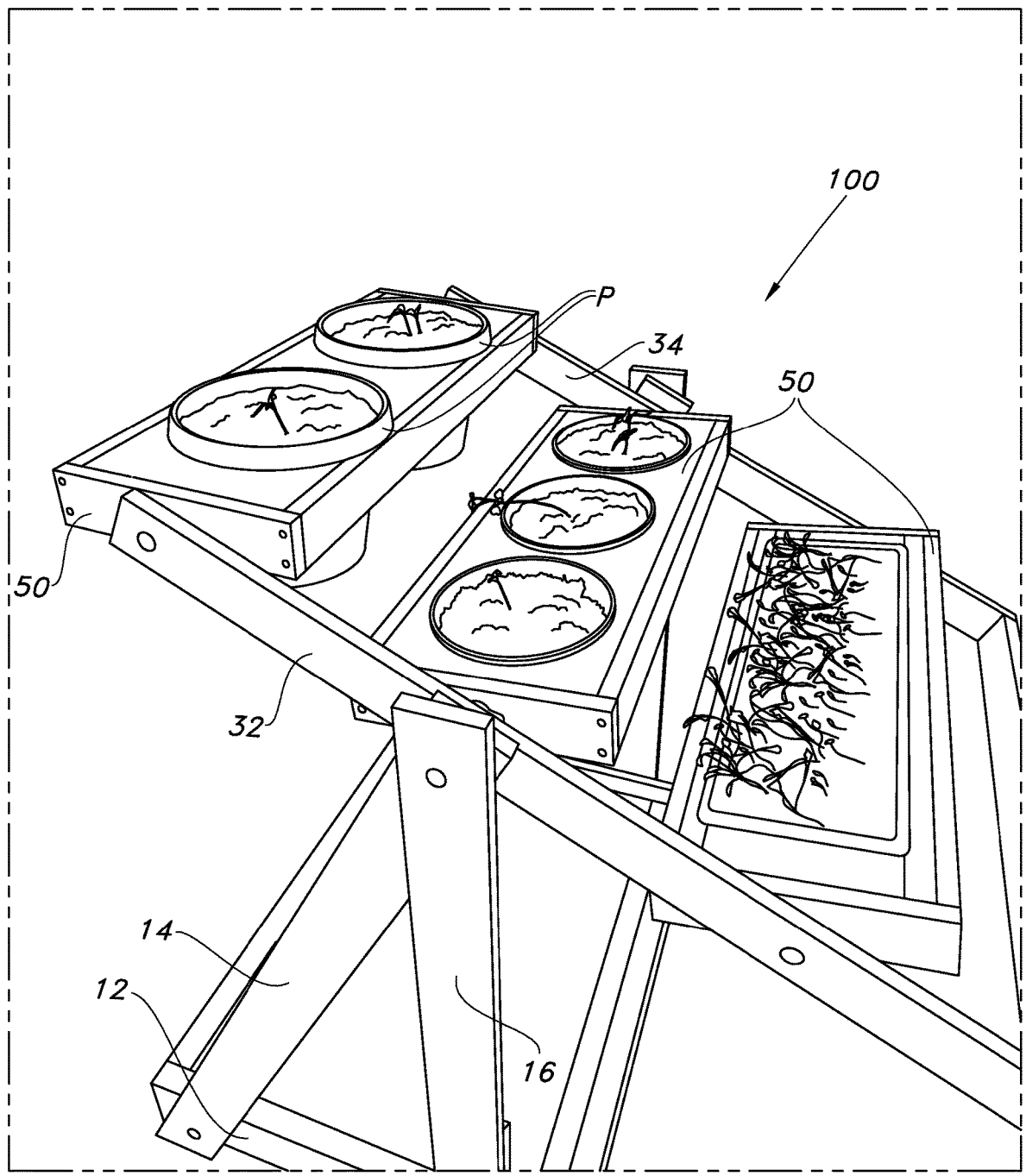
FIG. 2 is a perspective view of the planter as it transitions from a viewing position to a working position.
Figure 3:
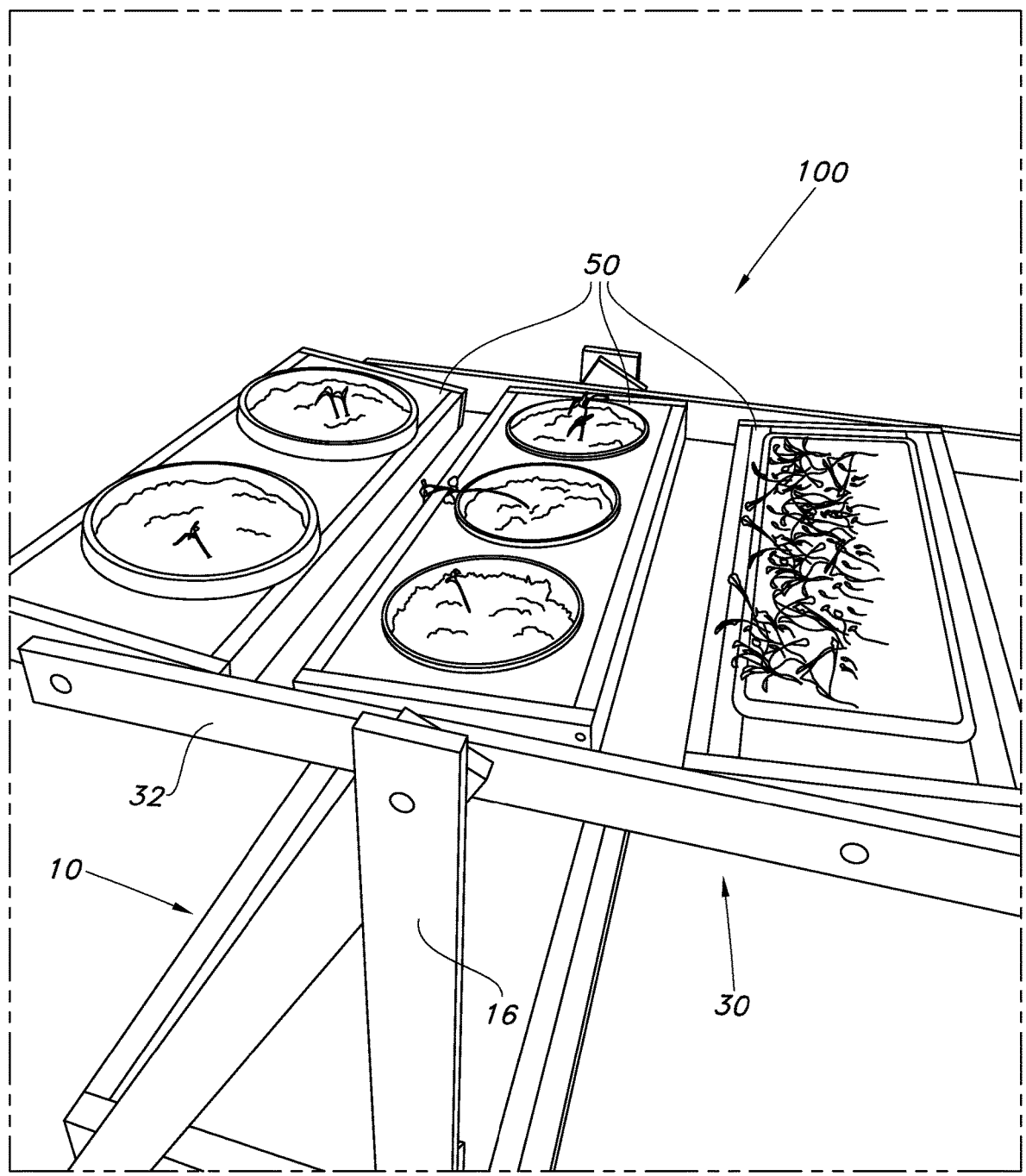
FIG. 3 is a perspective view of the planter in a working position.
Figure 4:
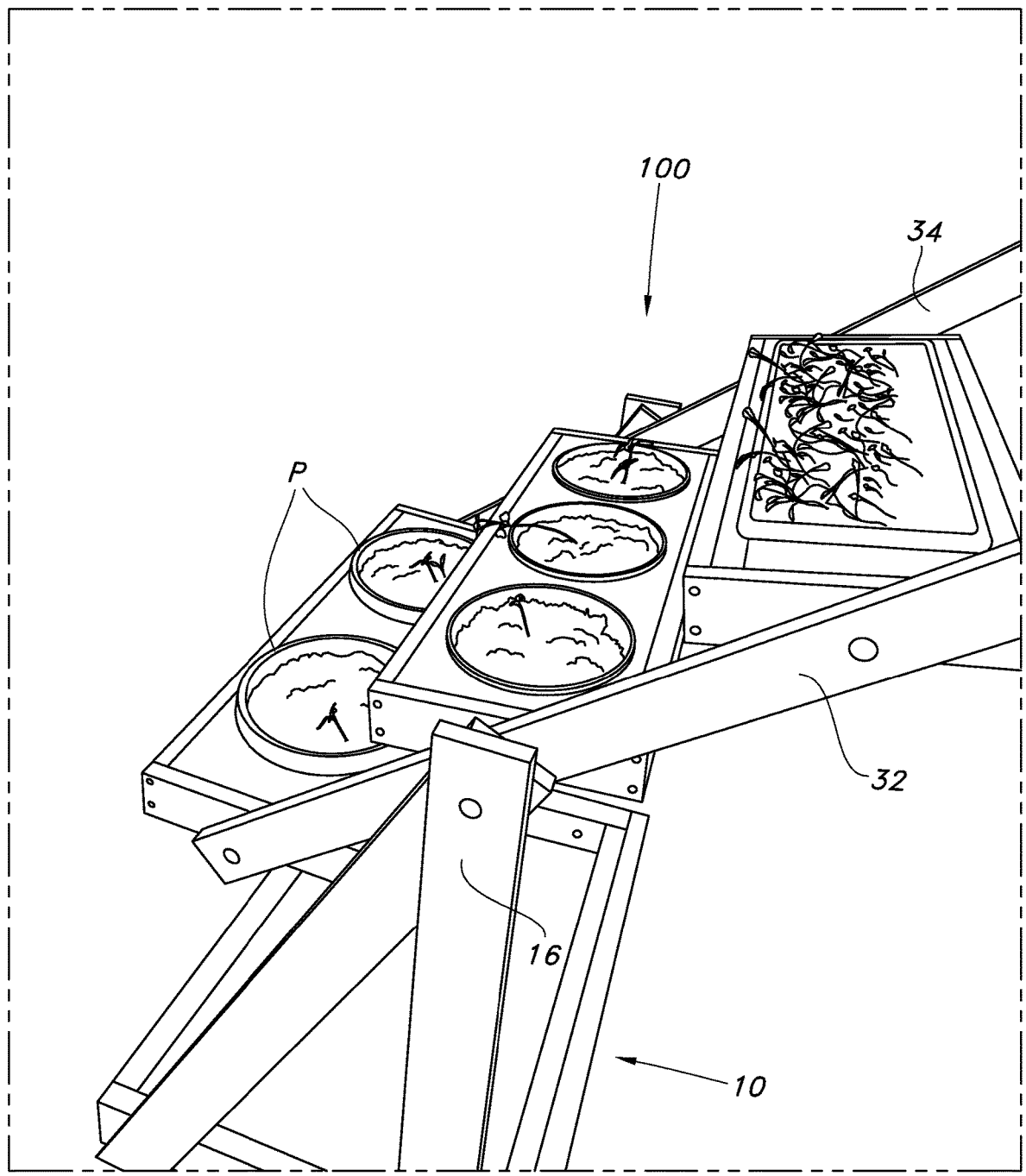
FIG. 4 is a perspective view of the planter as it is transitioned into a position towards a window.
Figure 5:
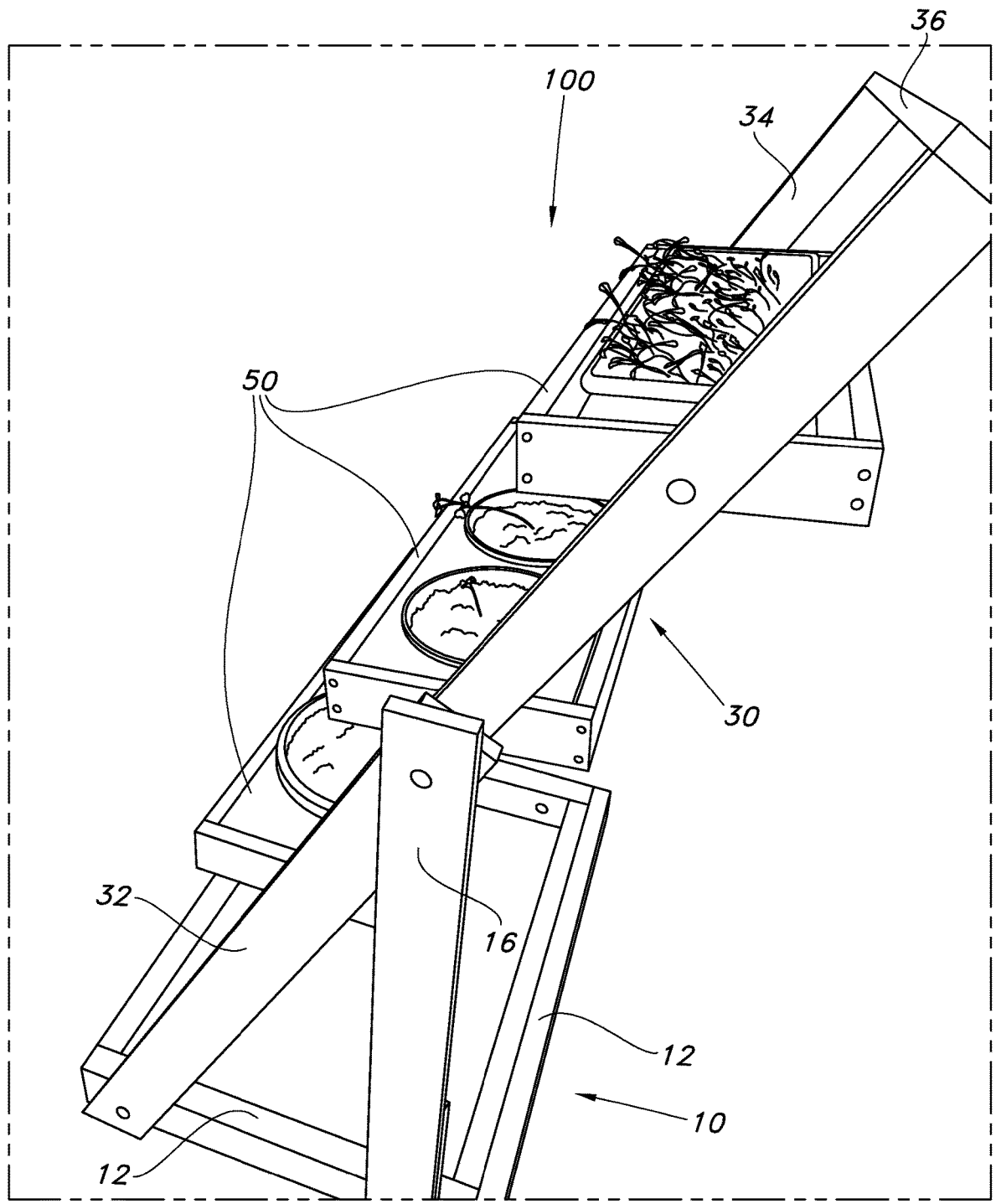
FIG. 5 is a perspective view of the planter positioned towards a window.
Figure 6:
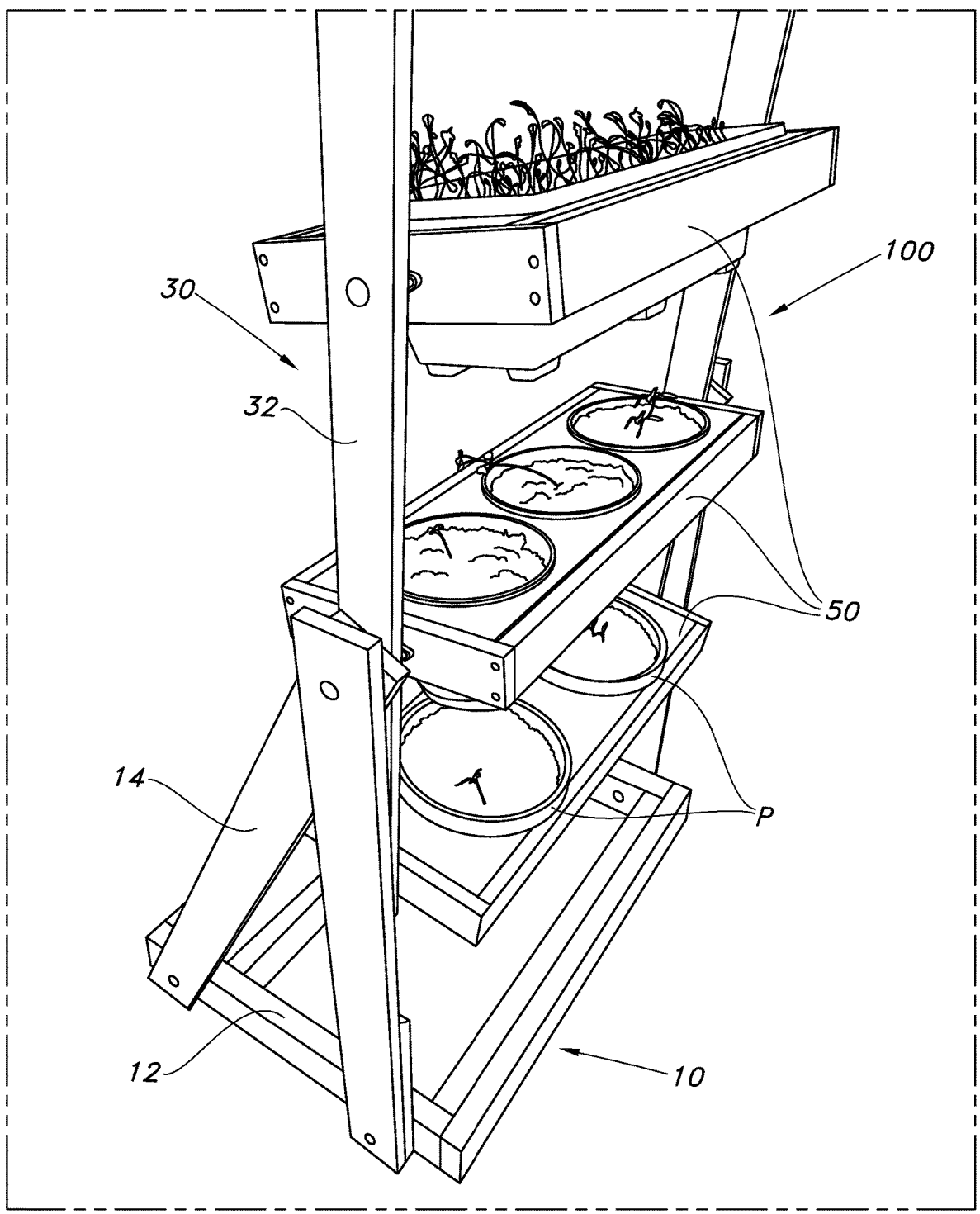
FIG. 6 is a perspective view that illustrates the planter frame in a near-vertical alignment.
Figure 7:
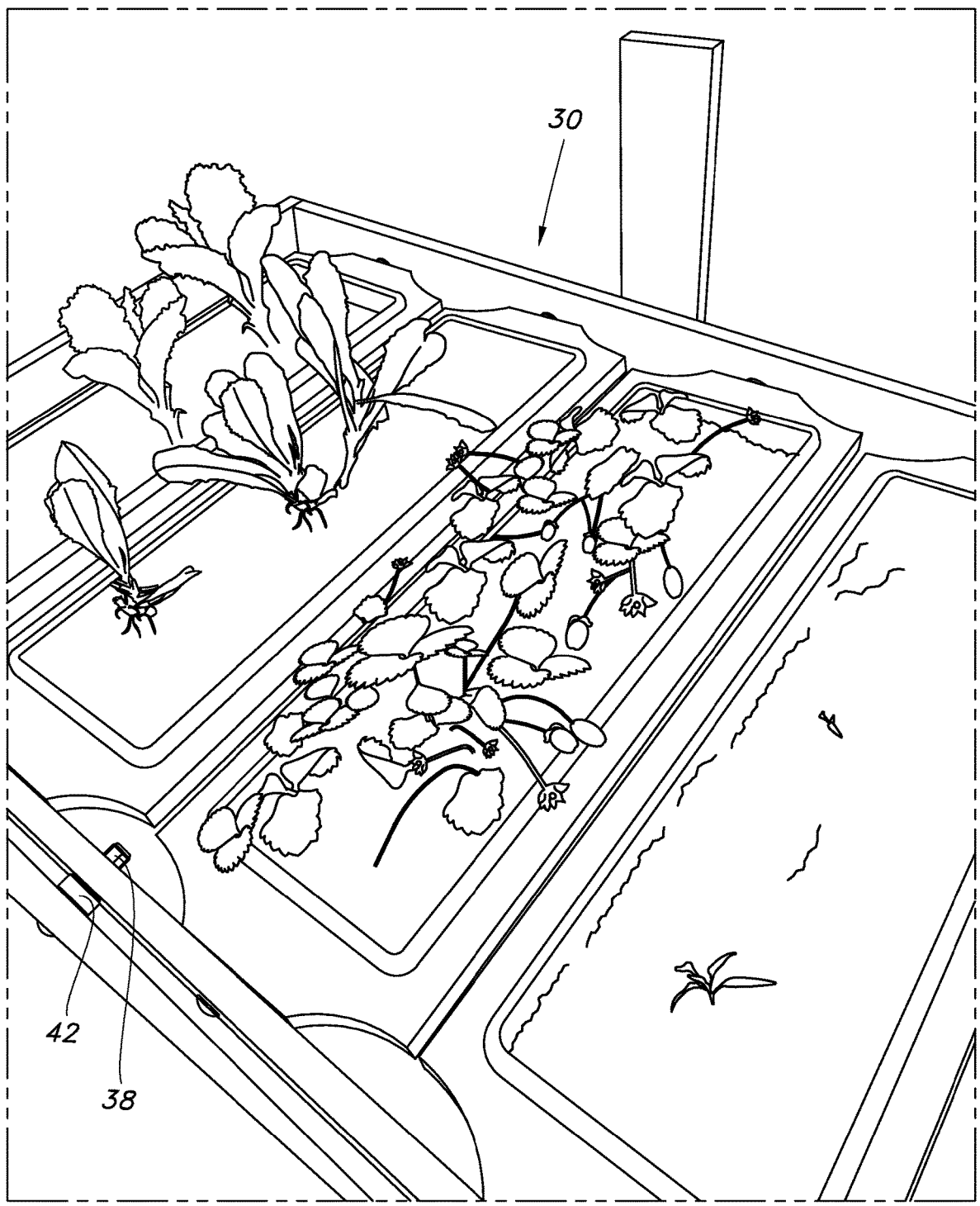
FIG. 7 is a perspective view that illustrates the planter pots in a working position.
Figure 8:
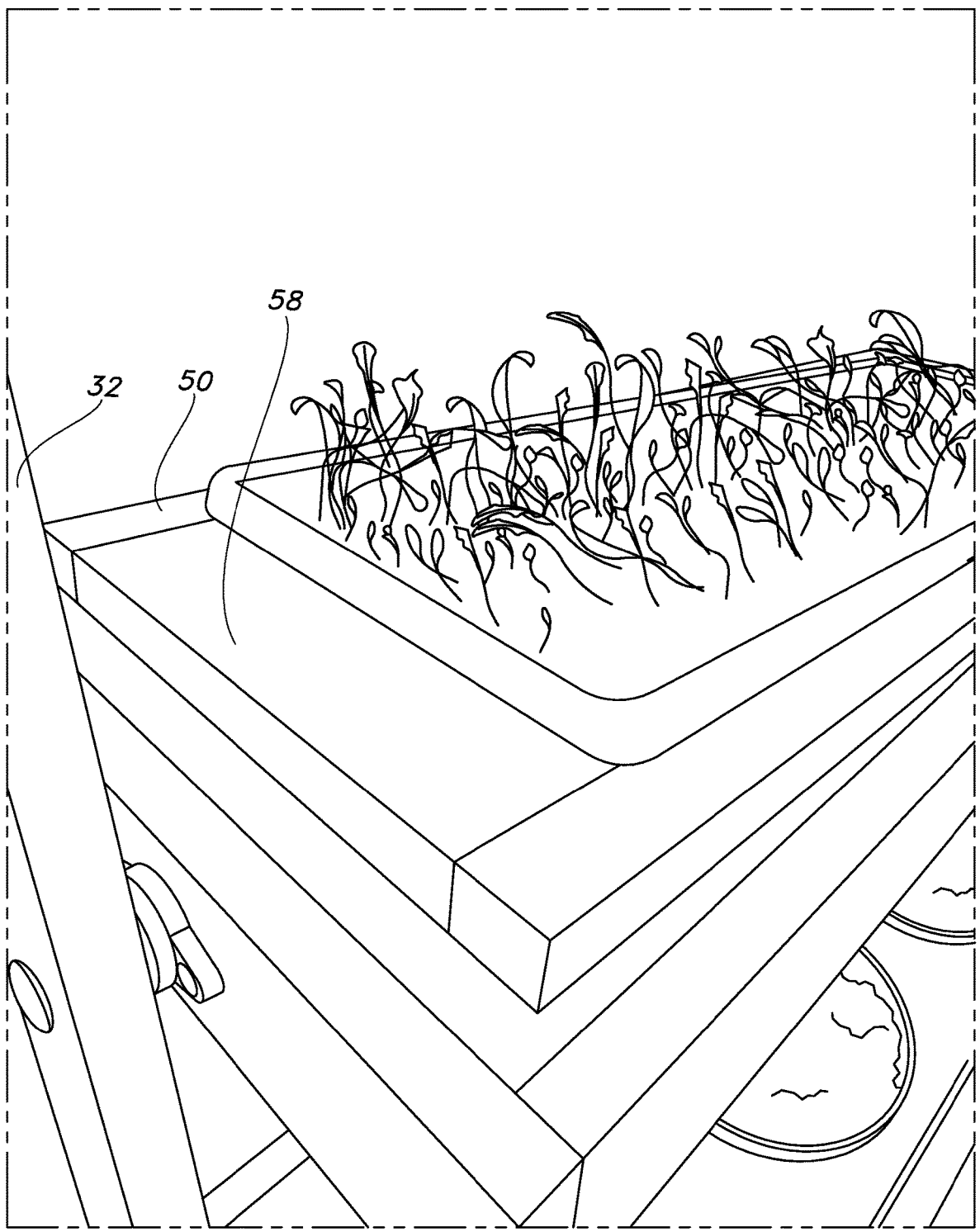
FIG. 8 is a close up view of a planter tray.
Figure 9:
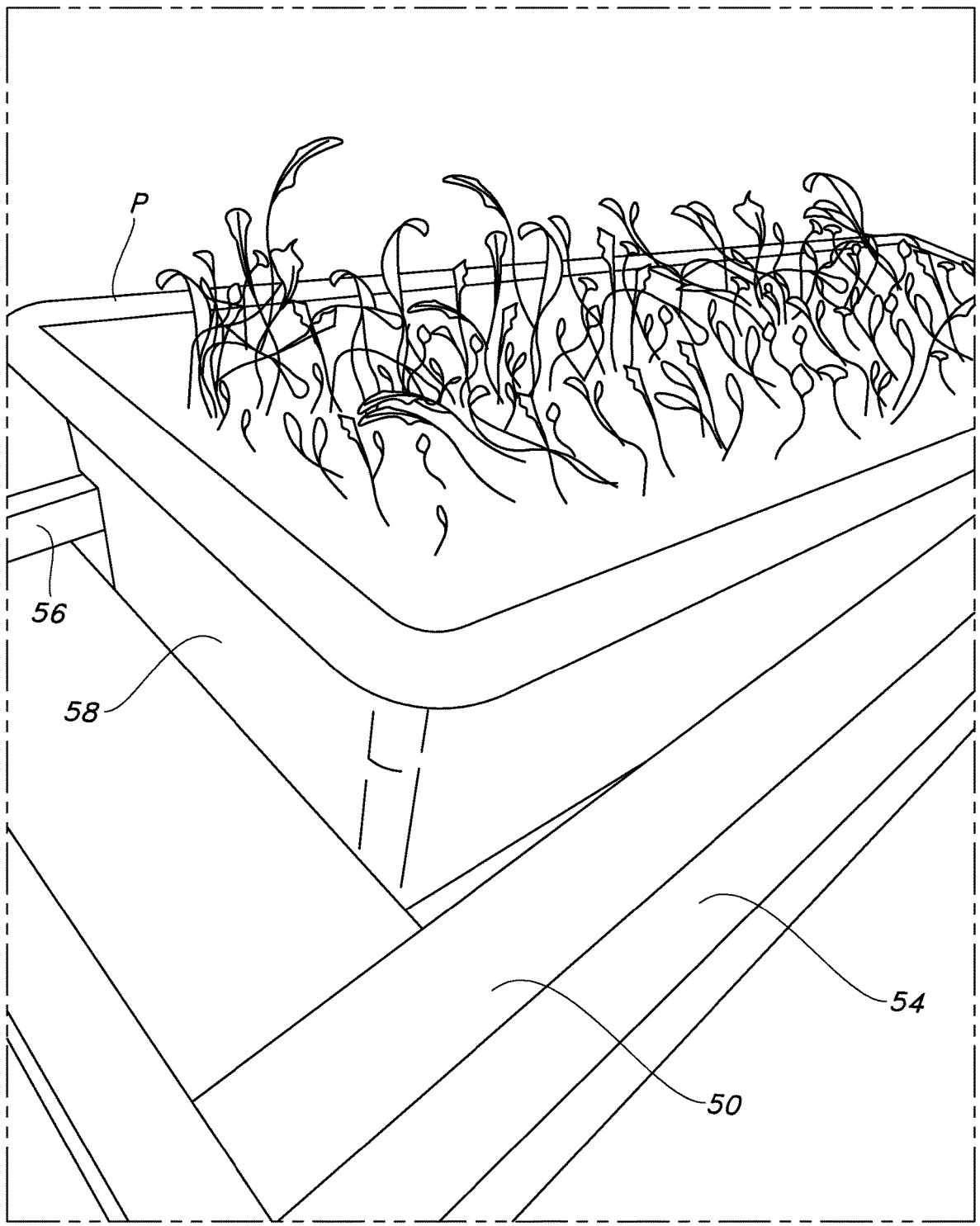
FIG. 9 is a close up view of a plant pot in the planter tray.
Figure 10:
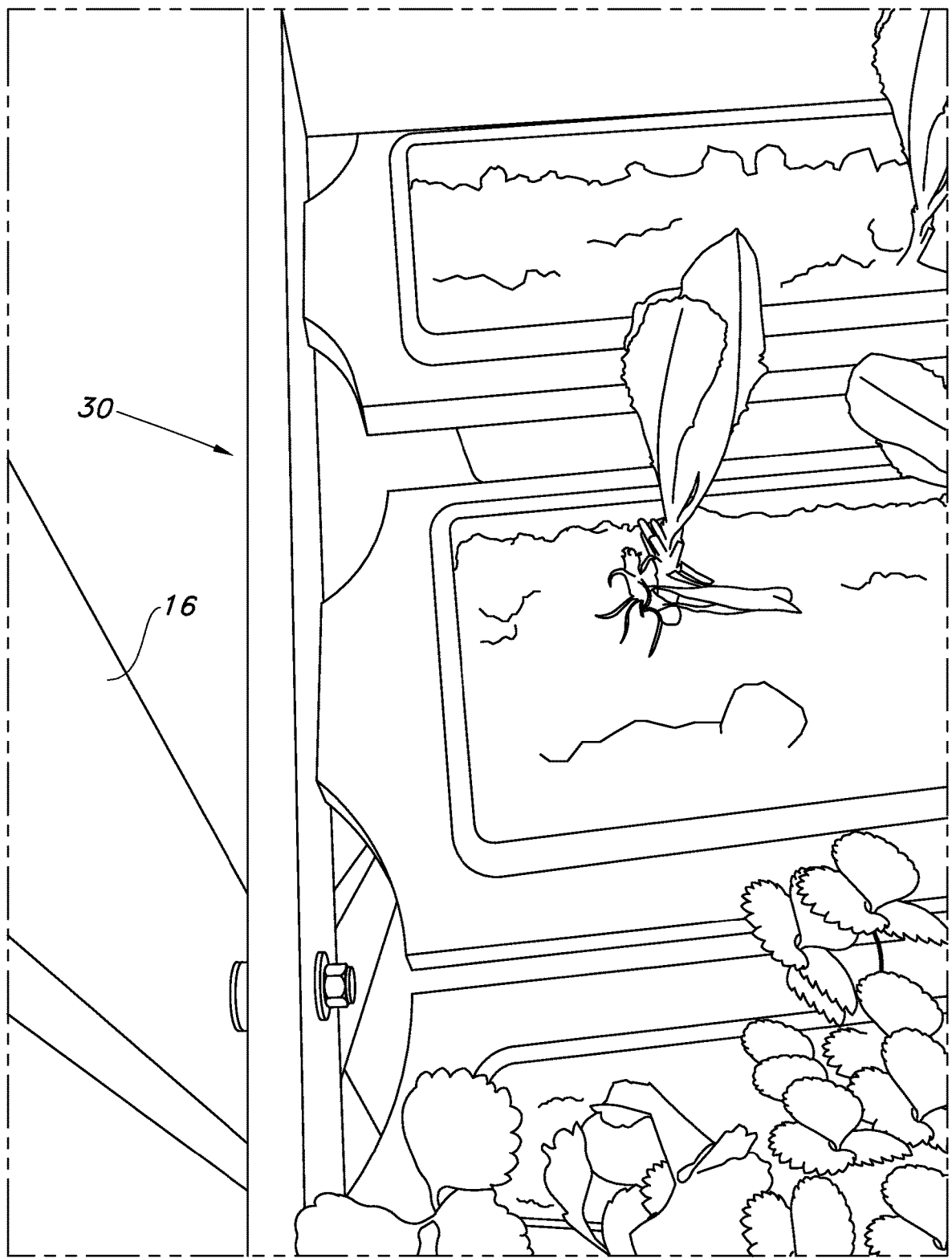
FIG. 10 is a close up view of the connector between the base frame and the planter frame.
Figure 11:
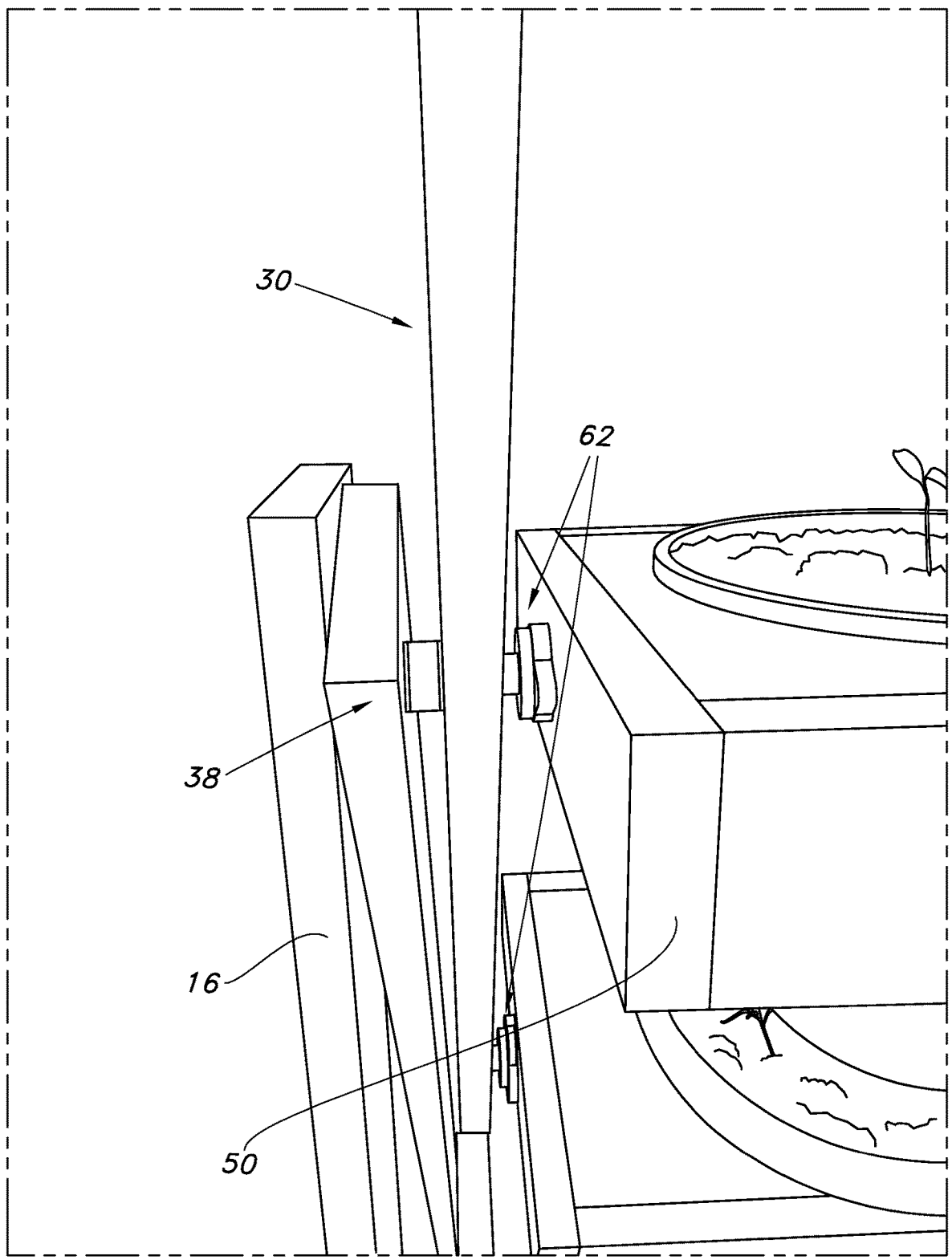
FIG. 11 is a close up, side view of the connector between the base frame and the planter frame and the planter tray.
Figure 12:
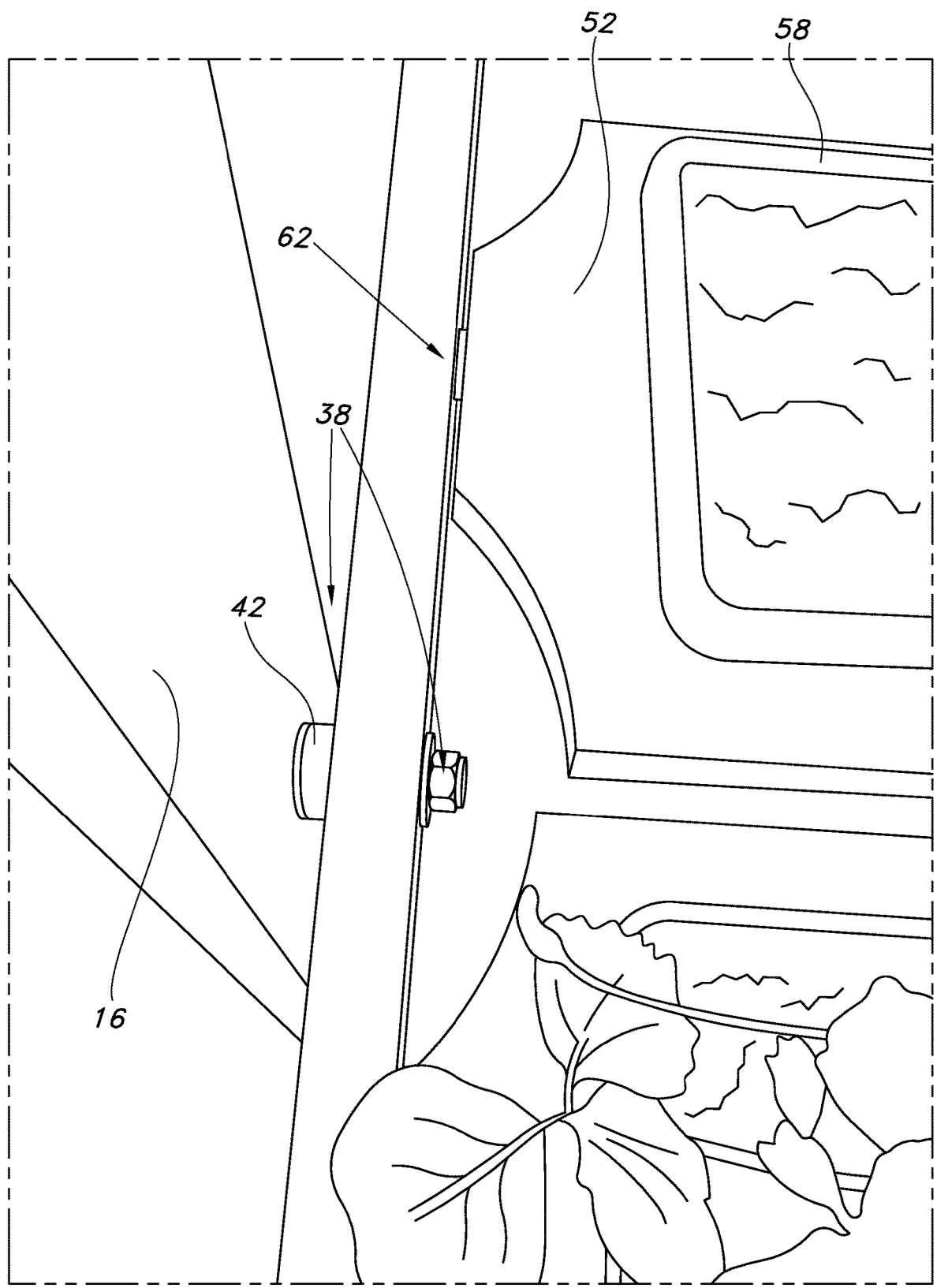
FIG. 12 is a close up top view of the connector between the base frame, planter frame and planter tray.

The present invention will now be described more fully in detail with reference to the accompanying drawings, in which the preferred embodiments of the invention are shown. This invention should not, however, be construed as limited to the embodiments set forth herein; rather, they are provided so that this disclosure will be complete and will fully convey the scope of the invention to those skilled in the art.

FIGS. 1-14 illustrate a rotatable plant holder 100 according to the invention, including a base frame 10 that rotatably supports a planter frame 30, and one or more planter trays 50 that are rotatably supported in the planter frame 30. Conventional plant pots P are supportable within the planter trays 50. The planter frame 30 is configured to rotate about a fixed point within the base frame 10 so as to allow the planter frame 30 in the vertical plane. Most embodiments allow for 360 degrees of rotation. As the planter frame 30 moves within the base frame 10 the planter trays 50 also move within the planter frame 30 so as to maintain an upright or nearly upright position. The rotatable plant holder 100 may be used inside or outside of a building structure, and certain components may have slightly different construction depending on whether the device is intended to be used inside or outside.

The base frame 10 may be configured in a number of suitable manners. In the embodiment shown in FIGS. 1-12, there are four floor supports 12, a vertical support 16, and a cross brace 14, all of which are assembled and secured using conventional techniques and fasteners. In general, the vertical support 16 should have a height around 36 inches so that the planter frame 30 is at a convenient working height for the average user when it is placed in a horizontal position. The vertical support 16 may also be configured, using conventional techniques, to have an adjustable height so that users may choose their preferred height.

Figure 13:
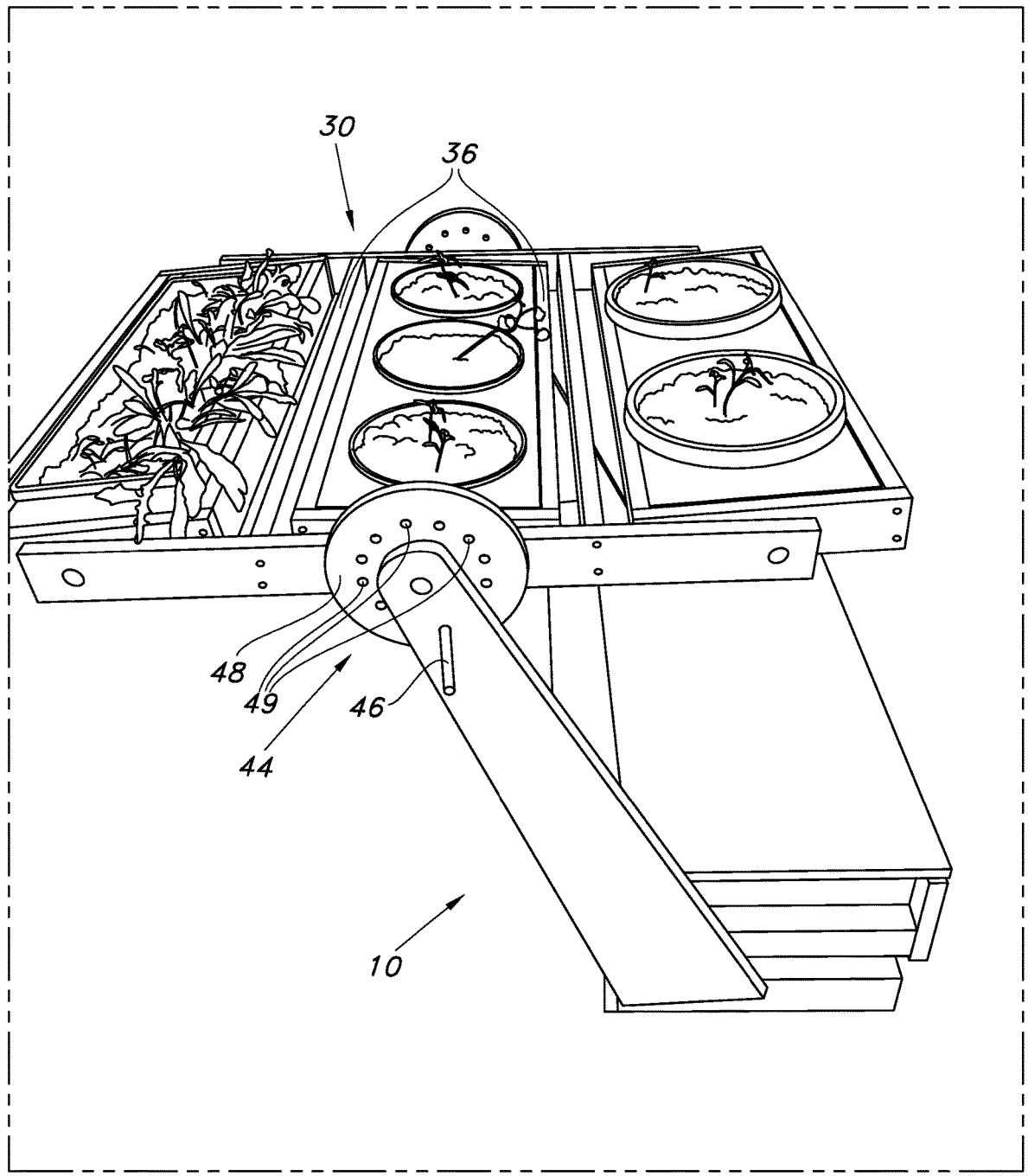
FIG. 13 is a side perspective view of an embodiment with a wall-mounted base with a locking mechanism for locking the planter frame in position relative to the base frame.
Figure 14:
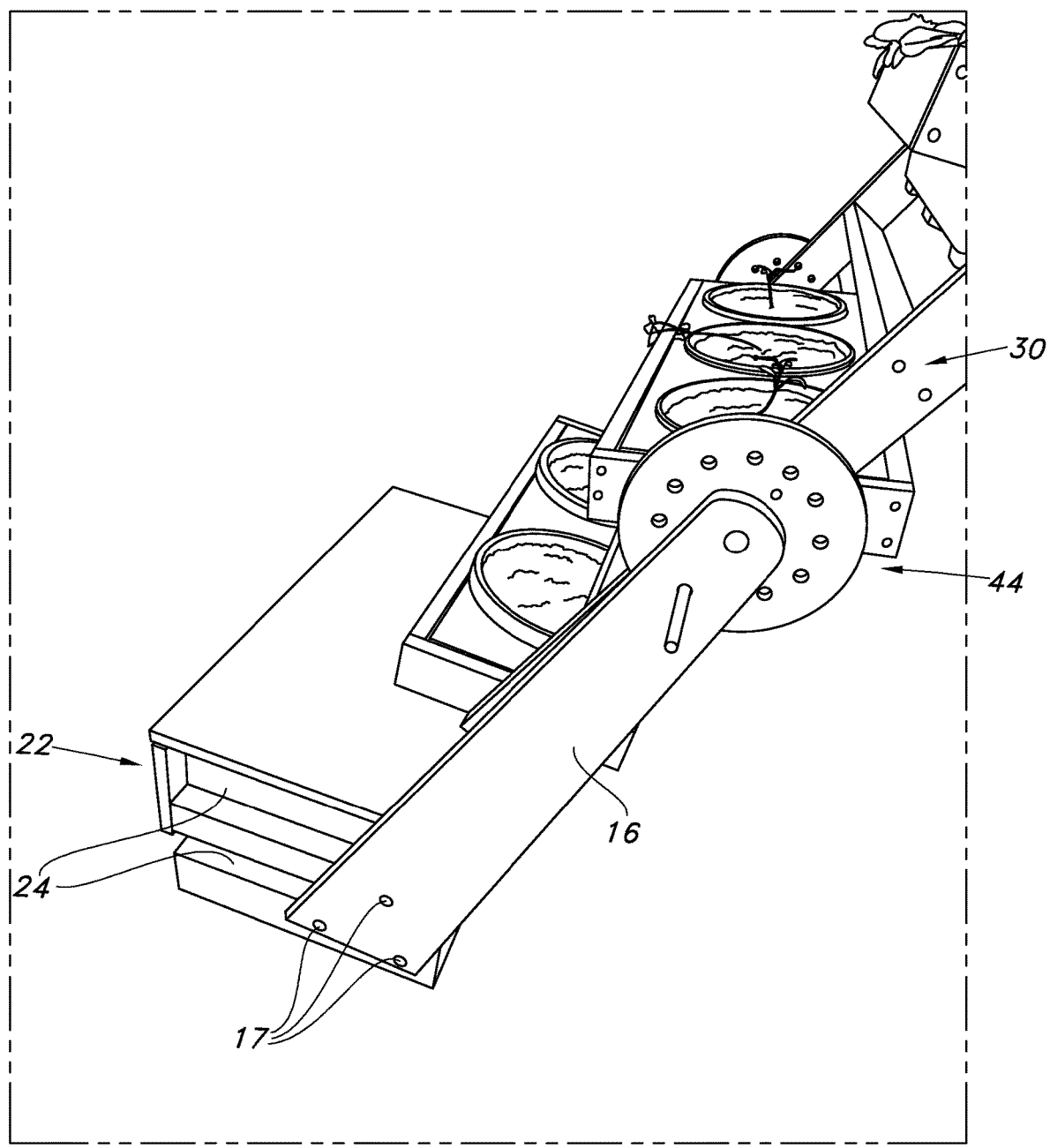
FIG. 14 is a side perspective view of the wall-mounted embodiment.

In an alternative embodiment shown in FIGS. 13 and 14, the base 10 is a wall mounted unit 22 in which the vertical support 16 is slightly angled and secured in the wall mount 22. In the embodiment shown, three rollers 17 are secured within two rails 24 on either side of the base are used to enable horizontal movement of the vertical support 16 so that it may slide towards or away from the wall so that the planter frame 30 may be positioned close to a window for better access to the light or, alternatively, slide away from the wall so that the planter frame may pivot to a different position within the two vertical supports 16 without contacting the wall. Other configurations are also feasible, such as those that include more or fewer rollers 17, or that have a different manner of coupling the base 10 to the frame 30. The wall mounted unit 22 may also include a drawer or be configured as an open storage area.

The planter frame 30 may similarly be configured in a number of suitable manners. In the embodiments shown, the planter frame 30 includes a first siderail 32, a second side rail 34, and one or more support rails 36, each of the first siderail 32 and second siderail 34 being connected to the support rails 36 using conventional means. The support rails 36 may be located in a number of positions, for example, in the embodiment shown in FIGS. 1-6, there is only one support rail 36 that is positioned near an end of the side rails 32, 34. Alternatively, the embodiment shown in FIGS. 13 and 14 includes two support rails 36 that are positioned between the trays 50. The side rails may also be constructed in an extendable manner to allow for additional trays 50. It is also possible to construct a planter frame that does not have support rails 36, and where instead the planter trays 50 effectively couple the side rails together to form the planter frame 30 within the base frame 10.

In general, the rotatable plant holder 100 may come in a variety of sizes, largely depending on the intended area of use as the area of use often places certain restrictions on the allowable size. One primary embodiment is intended for indoor use, where the holder 100 may at various times be positioned in a staggered position towards a window, be in a horizontal working position, or be staggered towards the inside of the room for viewing.

The embodiment illustrated in FIGS. 1-12 is ideally constructed for indoor use, and in particular to be positioned near a window so that the plants may receive sunlight during daylight hours. In this embodiment, the holder 100 may at various times be positioned in a staggered position towards a window, be in a horizontal working position, or be staggered towards the inside of the room for viewing. In this embodiment, having a vertical support 16 that measures approximately 36 inches is preferred as this creates a working surface having a height that is similar to most countertops. The overall length of the planter frame 32 is preferably sized relative to the base and the base's position relative to the wall so that the planter frame 32 may rotate freely without contacting the wall. For example, if the pivot point of the planter frame is 18 inches from the outer edge of the base frame, then the length of the planter frame is preferably less than 36 inches with no more than 18 inches on either side of the frame. This embodiment may also have a relatively narrow base to conserve floor space when the planter tray is positioned towards the window, the base 10 constructed to be position between the wall/window and the pivot point on the planter tray frame 32. A counterweight 18 may be placed on the floor support 12 that is closest to the window to ensure that the base frame 10 is able to maintain its position regardless of the position of the planter frame 30. Relatively small wheels that are sized appropriately for indoor use may be added to the base frame 10 to enable convenient movement of the device from one area to another.

Other embodiments of the base frame may have slightly different construction if, for example, it is intended for outdoor use or as a mounted unit, e.g., mounted to a wall, window, or railing. For outdoor use, positioning against or near a window is unlikely to be a concern and so the base 10 may extend the same distance on either side of the vertical support 16 and larger wheels are likely to be advantageous when moving over a ground area. The size of the base frame and plant holder frame are also not as much of a concern; however, it is still advantageous to construct the device 100 in a manner that places the plant holder frame at a reasonable height when it is in the horizontal working position so that the average user may access the plants in an ergonomic and comfortable manner.

In yet another embodiment, the size of the device may be significantly smaller such that it may be placed in, for example, a bay window. In this scenario the ability to stagger the device towards the window or towards the room serves the same purpose, but now the device may itself be placed on a table or counter when in the horizontal working position.

Each planter tray 50 is configured to hold one or more plant pots P and may be configured in a number of manners to hold pots of different shapes and sizes. FIG. 1, for example, illustrates three separate tray 50 configurations. In this embodiment, each tray 50 has two side walls 52, a front wall 54 and a rear wall 56, and a removable support platform 58. Having the removable support platform 58 allows users to customize the types, sizes, and shapes of the pots in each planter tray 50.

Each planter tray 50 is coupled to a swivel 62 that in turn is coupled to the planter frame 30. The swivel 62 may be as simple as a peg in an opening, or it may include a ball bearing device. While the support platform may be configured in a number of different manners, e.g., with differently sized pots in different openings/positions in the platform within the tray, it is important that the weight is approximately the same on either side of the support platform so that the tray swivels properly as the planter frame 30 is moved to different positions. For example, a support platform 58 that is configured to hold five plant pots may have one center located pot that weighs roughly 60 oz, and then two pots on one side that weigh 20 oz and 40 oz and two pots on the opposite side that also weigh 20 oz and 40 oz, respectfully. Seedling trays may be used in addition to conventional pots of varying sizes. Weights, or tilt weights, may be added to either the trays and/or the pots in order to cause the tray to maintain a certain tilt, for example if a grower wants the plants to be angled in a certain manner to receive better light.

Additionally, in the embodiments shown in the drawings, the planter trays 50 act as counterweights that facilitate an easy transition from one position to another. For example, the embodiments shown in FIGS. 1-6 include three planter trays 50 with one centrally located and the other two located on either side. In this instance, the two trays 50 located on either end of the planter frame 30 counterbalance one another. The embodiment shown in FIGS. 7 and 10, for example, has two trays on either side of the pivot point, with the two trays 50 on one side counterbalancing the two trays 50 on the other side. If, for example, 100 pounds of plants are placed on one end and 100 pounds placed on the exact opposite side, the two cancel each other out so moving that 200 pounds around takes essentially zero pounds of force.

The planter frame 30 is coupled to the base frame 10 by a threaded fastener 38. For example, in the embodiment shown, the two frames are coupled to one another with a tension bolt with a spacer 42 separating the two frames to allow for better movement. The fastener 38 may be adjusted to allow more or less movement of the planter frame 30 relative to the base frame 10. In some instances, such as those shown in FIGS. 7, 10 and 12, the fastener 38 may only connect the base 10 to the frame 30, while in other instances, such as those shown in FIGS. 1-6, the fastener may also be used to secure a tray 50. A locking system 44 may also be provided. For example, as shown in FIG. 13, a locking system 44 may be in the form of spring lock 46, whereby a donut 48 having openings 49 at varying orientations may be placed around the spacer, and a spring lock may move though an opening in the support post 16 to secure the lock in the desired opening.

It is understood that the embodiments described herein are merely illustrative of the present invention. Variations in the construction of the rotatable planter may be contemplated by one skilled in the art without limiting the intended scope of the invention herein disclosed and as defined by the following claims.

What is claimed is:

1. A rotatable plant holder comprising:
a base frame and a planter frame;
the base frame comprising lower support members and vertical support members, the lower support members configured to sit on a surface area, the vertical support members having an upper end and a lower end, the lower end of each of the vertical support members coupled to one of the lower support members;
the planter frame comprising a first siderail and a second siderail, each of the first siderail and second siderail having an elongated shape having a length and a width and where the length is greater than the width, and a midpoint that is located near a middle of the elongated shape;
at least two planter trays, each of the planter trays coupled to the planter frame, and an equal number of planter trays attached to either side of the midpoints;
each of the first siderail and the second siderail rotatably coupled to the upper end of one of the vertical support members by threaded fasteners at or near the midpoint on the respective siderail, the coupling of the threaded fasteners configured to allow movement in the vertical plane of the planter frame within the base frame;
the planter frame configured to freely rotate in the vertical plane between positions on either side of the base frame, the planter frame configured to allow manual rotation such that the planter frame may have at least a 45 degree angle relative to a surface area on either side of the base frame, the planter trays on one side of the midpoint configured to act as a counterbalance to the planter trays on the other side of the midpoint, such that the planter frame maintains its position within the base frame when not in a state of manual rotation.

2. The rotatable plant holder of claim 1, each of the planter trays configured to swivel within the planter frame.

3. The rotatable plant holder of claim 2, the planter trays maintaining a nearly upright position as the planter frame rotates within the base frame.

4. The rotatable plant holder of claim 1, the one or more planter trays including a removable support platform and wherein the support platform is configured to hold plant pots of varying shapes and sizes.

5. The rotatable plant holder of claim 1, further including a locking system that is configured to secure the planter frame in various positions.

6. The rotatable plant holder of claim 1, the planter trays coupled to the planter frame by a swivel that includes a ball bearing.

7. The rotatable plant holder of claim 1, wherein the counterbalancing of the planter trays enables manual rotation of the planter frame with approximately zero pounds of force.

8. The rotatable plant holder of claim 1, wherein each of the vertical support members include a first vertical support and a second vertical support, each of the first vertical supports having a first vertical support upper end and a first vertical support lower end, each of the second vertical supports having a second vertical support upper end and a second vertical support lower end, each of the first vertical support lower ends and the second vertical support lower ends coupled to one of the lower supports members, each of the first vertical support upper ends and the second vertical support upper ends coupled to one of the side rails by one of the threaded fasteners.

9. The rotatable plant holder of claim 8, wherein the vertical support members are separated from the siderails by a spacer.

10. The rotatable plant holder of claim 8, wherein the lower ends of the vertical support members are slidably coupled to the lower support members.

11. The rotatable plant holder of claim 8, wherein the lower support members include two lower side support members and two lower cross support members, each of the two lower side support members coupled to one of the first vertical support lower ends and one of the second vertical supports lower ends, each of the lower cross support members extended between and coupled to the lower side support members.

* * * * *